United States Patent
Taniuchi et al.

(10) Patent No.: US 7,833,300 B2
(45) Date of Patent: Nov. 16, 2010

(54) MOUNTING STRUCTURE OF FILTER FOR COOLER OF CONSTRUCTION

(75) Inventors: Tomoya Taniuchi, Hiroshima (JP); Koji Yonezawa, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 350 days.

(21) Appl. No.: 12/035,081

(22) Filed: Feb. 21, 2008

(65) Prior Publication Data

US 2008/0202451 A1 Aug. 28, 2008

(30) Foreign Application Priority Data

Feb. 23, 2007 (JP) ............... 2007-044098

(51) Int. Cl.
*B01D 46/42* (2006.01)
(52) U.S. Cl. .................. 55/385.3; 55/480; 55/493; 55/502; 123/198 E
(58) Field of Classification Search .............. 55/502, 55/481, 493, 498, 497, 500, 503, 385.3, 385.1, 55/506, 480; 123/198 E
See application file for complete search history.

(56) References Cited

U.S. PATENT DOCUMENTS 5,399,180 A * 3/1995 Kopp .................. 55/493
6,231,630 B1 * 5/2001 Ernst et al. ............ 55/385.3
7,473,292 B2 * 1/2009 Moriyama et al. ......... 55/502

FOREIGN PATENT DOCUMENTS

| EP | 1 832 731 A1 | 9/2007 |
| JP | 49-146331 | 4/1973 |
| JP | 1-93328 | 6/1989 |
| JP | 4-3827 | 1/1992 |
| JP | 2001-260947 | 9/2001 |
| JP | 2001-342645 | 12/2001 |
| JP | 2006-52689 | 2/2006 |
| JP | 2006-57245 | 3/2006 |
| JP | 2006-206034 | 8/2006 |
| JP | 2006-242077 | 9/2006 |

* cited by examiner

*Primary Examiner*—Duane Smith
*Assistant Examiner*—Minh-Chau Pham
(74) *Attorney, Agent, or Firm*—Oblon, Spivak, McClelland, Maier & Neustadt, L.L.P.

(57) ABSTRACT

On the front surface side of a cooler, a filter mounting portion provided with a filter abutment surface with which a filter is brought into abutment from the front side of the filter mounting portion is provided. The front end side of the filter pushed in from a maintenance port is pressed onto an elastic body formed of a plate spring and provided in the filter mounting portion. Thereby, by a pressing force F1 serving as a component force of a restoring force F of the elastic body, the filter is pressed onto the filter abutment surface, and by a position fixing force F2, the filter is pushed rearwards so as to ensure an engagement state of an engaging claw and an engaging hole.

8 Claims, 9 Drawing Sheets

MOUNTING STRUCTURE OF FILTER FOR COOLER OF CONSTRUCTION

BACKGROUND OF THE INVENTION

1. Field of the Invention

The present invention relates to a mounting structure of filter for cooler of construction machine detachably mounted on the front surface side of the cooler such as radiator.

2. Description of the Related Art

In a hydraulic excavator, a working attachment (not shown) is mounted in a front section of an upper rotating body 2 disposed rotatably around a vertical shaft on a crawler type lower traveling body 1 shown in FIGS. 8 and 9.

As shown in FIG. 9, an engine 4 is installed in the left and right direction (width direction) of the upper rotating body 2 in an engine room 3 in a rear section of the upper rotating body 2.

On the right side of the engine 4 (the right side seen from the rear side of the upper rotating body 2, the same is applied to the direction of the left and right below), is provided a hydraulic pump 5 driven by the engine 4, and on the left side thereof, is provided a cooler 6.

The cooler 6 is formed of a plurality of heat exchangers such as a radiator for cooling the engine, an oil cooler for cooling working oil and an intercooler for a turbocharger. Here, for the sake of convenience, the cooler 6 is shown as a single unit.

By rotation of a cooling fan 7 provided between the cooler 6 and the engine 4, the outside air is sucked in from a suction opening (not shown) in an external body (usually called as a guard) for forming the engine room 3 and passes through the cooler 6 as the cooling air.

The upper surface side of the external body is formed of a hood 8 (refer to FIG. 8) provided with a bonnet, and a back surface and a side surface thereof are formed of a counterweight 9.

Maintenance ports 10 and 11 from the exterior on both the left and right sides of the counterweight 9 are opened and closed by maintenance panels 12 and 13. It should be noted that hinges 14 are centers for opening and closing the panels 12 and 13.

To a tip of a duct 15 for bringing the sucked air to the cooler 6 on the front surface side of the cooler 6 (the side of a surface opposing to a flow of the sucked air, that is, a surface on the left side of the upper rotating body 2), is detachably mounted a filter 16.

A portion of mounting the filter is enlarged and shown in FIGS. 10 and 11.

For the sake of convenience of treatment or the like, the filter 16 is divided into two as in FIG. 11, and both upper and lower filters 17 and 18 are mounted to the tip of the duct in a state of being in contact with each other on the upper and lower sides respectively.

In a peripheral edge of the tip of the duct, is provided a filter mounting portion 19 provided with a filter abutment surface 19a facing towards the upstream side of the air flow. A peripheral edge part of the filter 16 is fitted into the mounting portion 19 in a state of being brought into abutment with the abutment surface 19a.

Specifically, an upper end part and both front and rear end parts of the upper filter 17 (both front and rear end parts in the case of following the direction of the upper rotating body 2, that is, both left and right end parts seen from the upstream side of the air flow) are mounted to the filter mounting portion 19, and a lower end part and both front and rear end parts of the lower filter 18 are mounted to the filter mounting portion 19.

It should be noted that precisely speaking, in the filter 16 (the upper and lower filters 17 and 18), a filter frame is mounted to a circumference of a filter main body. There is sometimes a case where the filter 16 is directly mounted on the front surface side of the cooler 6 without the duct 15. Further, there is sometimes a case where the filter 16 is formed as a single filter.

The above configuration is disclosed in Japanese Patent Laid-Open Nos. 2006-52689 and 2001-342645.

Since maintenance is highly frequently required for the filter 16, the filter 16 is detachably mounted to the filter mounting portion 19.

Conventionally, as mounting means, a fastening tool such as a butterfly bolt and a pin is used for the peripheral edge part of the filter 16 (an upper part and both the front and rear sides of the upper filter 17 and a lower part and both the front and rear sides of the lower filter 18).

In such a case, attachment and detachment of the filter 16 are more desirably performed through the left maintenance port 10 from the ground by opening the left maintenance panel 12 as in FIG. 9 than performed from the upper surface side of the engine room by getting on the hood 8 in terms of operating efficiency and safety.

However, a filter attachment and detachment operation such as fastening-back of the fastening tool, inserting and taking-out of the pin and positioning at the time of mounting is troublesome, and there is a fear that the fastening tool is lost.

Further, since the front end side of the filter which is the inner side seen from the maintenance port 10 is not easily touched and accessed, an operation of the fastening tool is further troublesome and a work is hard.

Therefore, work efficiency at the time of attaching and detaching the filter is deteriorated and maintenance property is degraded.

SUMMARY OF THE INVENTION

It is an object of the present invention to provide a mounting structure of filter for cooler of construction machine capable of greatly improving workability in attachment and detachment of a filter.

The present invention is a mounting structure of filter for cooler of construction machine detachably mounted on the front surface side of the cooler installed in an engine room of an upper rotating body disposed on a lower traveling body, provided with a configuration that a filter mounting portion provided with a filter abutment surface with which the filter is brought into abutment from the front side of the filter mounting portion is provided on the front surface side of the cooler, an external body for forming the engine room is provided with a maintenance port into or from which the filter is inserted or taken out, and an elastic body for exerting an elastic force in the direction of fixing a position of the filter inserted from the filter maintenance port to the filter mounting portion in a state that the filter is pressed onto the filter abutment surface is provided.

According to the present invention, by the elastic force of the elastic body such as a plate spring, the filter is pressed onto the filter abutment surface and a position thereof is fixed. Therefore, in comparison to a conventional mounting structure of using a fastening tool such as a butterfly bolt, there is no need for a troublesome fastening operation and position fixing, and the fastening tool is not lost.

The present invention is a configuration that the elastic force works as a pressing force and a position fixing force for the filter, and there is no part which is directly fastened by hand unlike a conventional fastening tool method. Therefore, there is no need for accessing to the inner side which is not easily touched.

With the above points, an attachment and detachment work of the filter is easily performed and it is possible to greatly improve maintenance property.

In such a case, the pressing force and the position fixing force by the elastic body for the filter are preferably exerted on the front end side of the filter in the present invention provided with the following configuration.

That is, in the present invention with the above configuration, the filter is provided in the front and rear direction of the upper rotating body, while the elastic body is provided in a state of exerting a pressing force of pressing the filter onto the filter abutment surface on the front end side of the filter and a position fixing force of pushing the filter rearwards.

Further, in the present invention with the above configuration, an engaging claw is provided in one of a rear end part of the filter and the filter mounting portion, an engaging hole is provided in the other, and the position fixing force of the elastic body works as a force in the direction of engaging the engaging claw with the engaging hole.

In the present invention with any of the above configurations, a counterweight also serving as a part of the external body is provided in a rear end part of the upper rotating body, a maintenance port is provided in the counterweight, and cutouts for accepting passage of the filter at the time of inserting or taking out the filter are provided in opening edge parts on both the upper and lower sides of the maintenance port.

In the present invention with the above configuration, preferably, the filter is provided in the front and rear direction of the upper rotating body, and the elastic body is provided in a state of exerting a pressing force of pressing the filter onto the filter abutment surface on the one end side in the up and down direction of the filter, and a position fixing force in the up and down direction.

In such a case, in the present invention, the pressing force and the position fixing force by the elastic body for the filter are exerted on the one end side in the up and down direction of the filter.

With any of the above configurations, preferably, a duct for bringing the air taken from the exterior to the cooler is provided on the front surface side of the cooler, and the filter mounting portion is provided in a tip of the duct. In such a case, with the configuration that the duct is provided in the front surface of the cooler, the filter is pressed and the position thereof is fixed onto the filter mounting portion of the duct.

With any of the above configurations, preferably, the filter is divided into an upper filter and a lower filter on the upper and lower sides respectively, and elastic bodies are provided in both the filters respectively. In such a case, with the configuration that the filter is divided into the upper filter and the lower filter, both the filters are pressed and positions thereof are fixed.

Here, according to the present invention with the configuration as above described that the engaging claw is provided in one of the rear end part of the filter and the filter mounting portion, the engaging hole is provided in the other, and the position fixing force of the elastic body works as the force in the direction of engaging the engaging claw with the engaging hole, the position fixing force of the elastic body works as the force in the direction of engaging the engaging claw with the engaging hole. Therefore, it is possible to ensure a more stable filter fixing effect.

With the configuration that the maintenance port is provided in the counterweight, the maintenance port is desirably minimized for an original function of counter balance, while space for inserting or taking out the filter is required to be ensured.

At the above point, according to the present invention with the configuration as above described that the counterweight also serving as a part of the external body is provided in the rear end part of the upper rotating body, the maintenance port is provided in the counterweight, and the cutouts for accepting the passage of the filter at the time of inserting or taking out the filter are provided in the opening edge parts on both the upper and lower sides of the maintenance port, the cutouts for accepting the passage of the filter are provided in the opening edge parts on both the upper and lower sides of the maintenance port in the counterweight. Therefore, it is possible to respond the two requirements mentioned above at the same time.

Moreover, since the cutouts serve as guides for inserting or taking out the filter, the filter attachment and detachment work is more easily performed.

Meanwhile, in a situation or the like that the filter is inserted into or taken out from the front surface side of the cooler, and moreover, size of the maintenance port in the up and down direction is small for the filter, an end part of the filter in the up and down direction is an end part on the inner side.

At the above point, according to the present invention with the configuration as above described that the filter is provided in the front and rear direction of the upper rotating body, and the elastic body is provided in a state of exerting the pressing force of pressing the filter onto the filter abutment surface on the one end side in the up and down direction of the filter, and the position fixing force in the up and down direction, the pressing force and the position fixing force by the elastic body for the filter are exerted in the up and down direction. Therefore, even in the above situation, it is possible to easily perform the filter attachment and detachment work.

DESCRIPTION OF THE PREFERRED EMBODIMENTS

Figure 1:
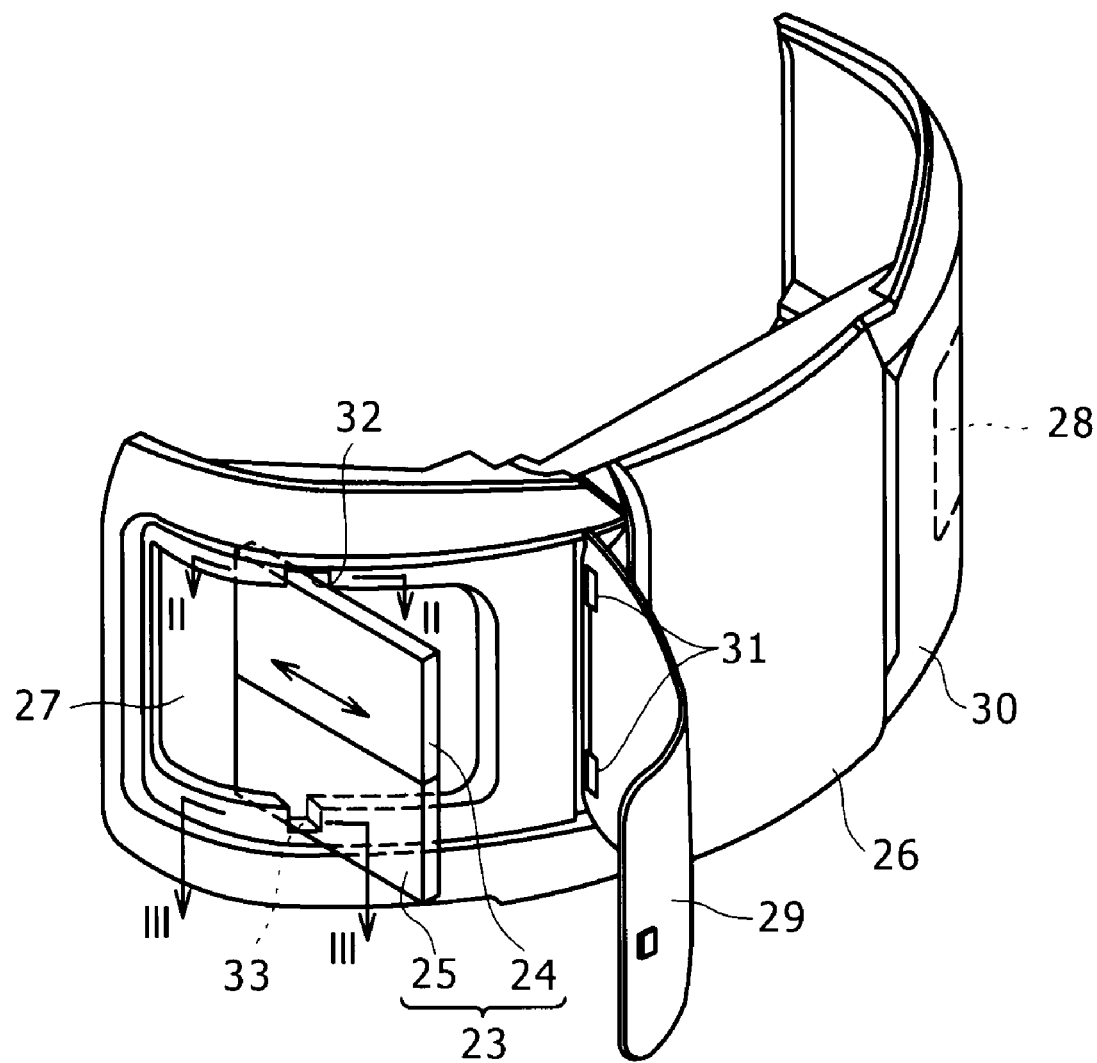
FIG. 1 is a perspective view of a counterweight and a filter showing a situation of inserting or taking out the filter in a first embodiment of the present invention.

A description will be given to embodiments of the present invention with reference to FIGS. 1 to 7.

In the embodiments below, a hydraulic excavator is an object to which the present invention is applied. An example thereof is a case where as shown in FIGS. 2 and 3, a duct 21 is provided in a front surface of a cooler 6 installed in an engine room 3, and a filter 23 is mounted to a filter mounting portion 22 provided in a peripheral edge part of a tip of the duct 21.

The filter 23 has a structure in which the filter 23 is divided into an upper filter 24 and a lower filter 25 on the upper and lower sides as well as the filter 16 in the related art. Both the filters 24 and 25 are mounted to the filter mounting portion 22 in a state of being in contact with each other in the up and down direction.

First Embodiment (Refer to FIGS. 1 to 4)

Figure 2:
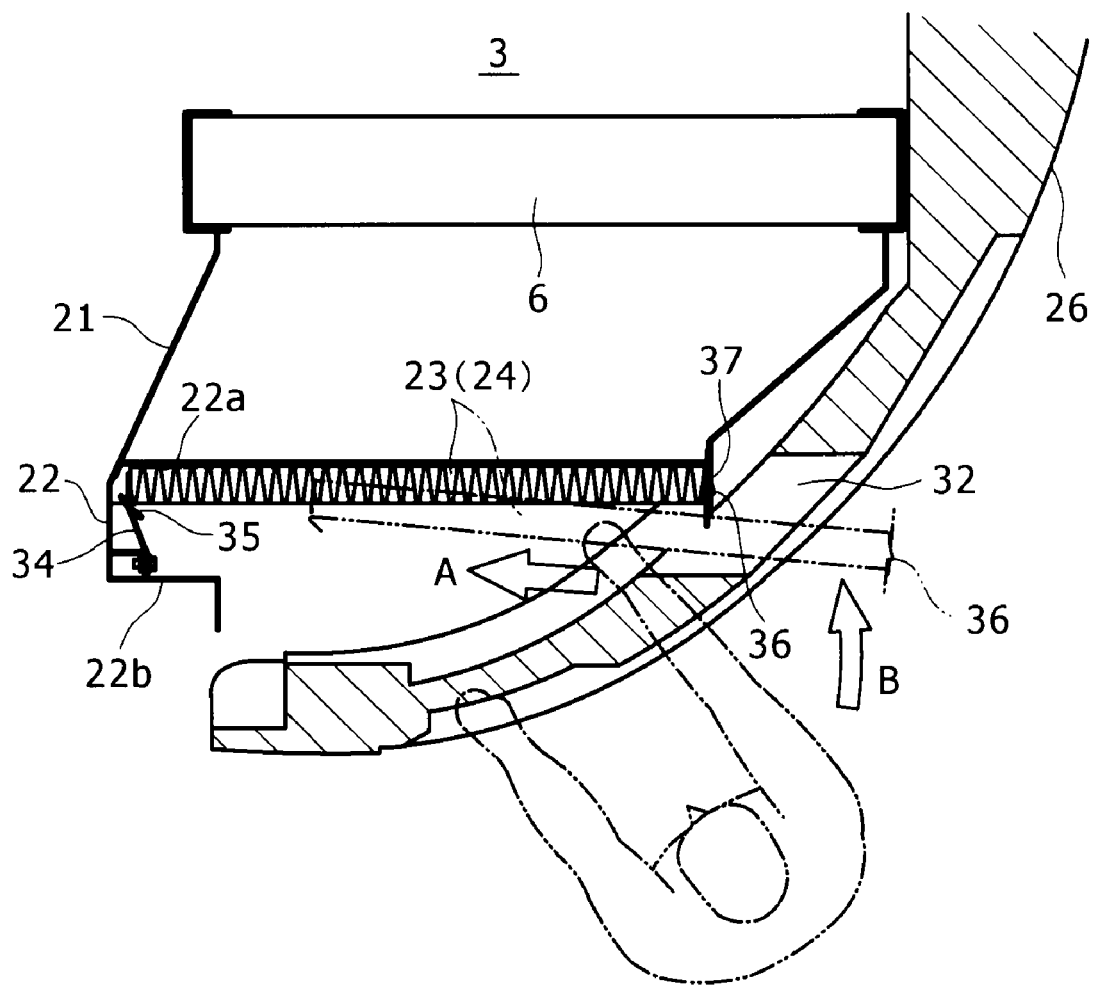
FIG. 2 is an enlarged sectional view by line II-II of FIG. 1 showing a state of mounting the filter.
Figure 3:
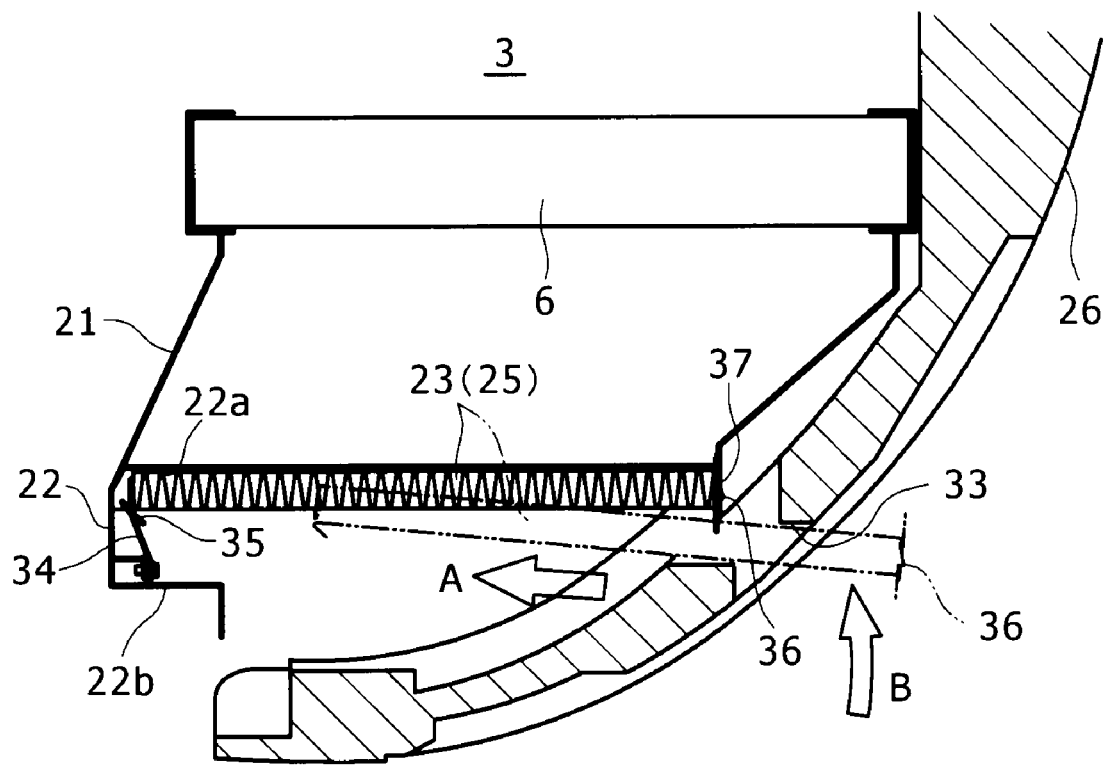
FIG. 3 is an enlarged sectional view by line III-III of FIG. 1.

As shown in FIGS. 1 to 3, in a counterweight 26 also serving as a part of an external body for forming the engine room, are provided left and right maintenance ports 27 and 28, and maintenance panels 29 and 30 for opening and closing the maintenance ports (in FIG. 1, the reference numeral 31 denotes hinges serving as opening and closing supporting points of the left maintenance panel 29). The filter 23 is inserted or taken out through the left maintenance port 27 among the ports.

As means for easily performing the inserting and taking-out of the filter 23 (both the upper and lower filters 24 and 25), cutouts (both upper and lower cutouts) 32 and 33 are provided in opening edge parts on both the upper and lower sides of the left maintenance port 27 in the counterweight 26.

The upper cutout 32 is formed so as to have width for accepting passage of an upper end part of the upper filter 24, and the lower cutout 33 is formed so as to have width for accepting passage of a lower end part of the lower filter 25. By the cutouts 32 and 33, it is possible to easily insert and take out both the filters 24 and 25 in the front and rear direction with maintaining a vertical posture thereof.

The cutouts 32 and 33 position both the filters 24 and 25 towards mounting positions at the time of mounting the filter, and also have a function as guides for determining the direction. That is, only by matching the upper end part of the upper filter 24 and the lower end part of the lower filter 25 with the cutouts 32 and 33, it is possible to determine the positions and the inserting direction of both the filters 24 and 25. Then, by pushing in along the cutouts 32 and 33, the front end side of the filter which is the inner side seen from an operator is led to the front end side of the filter mounting portion 22.

A description will be given to means for mounting both the filters 24 and 25 to the filter mounting portion 22 with reference to FIGS. 2 to 4.

In the filter mounting portion 22, are provided a filter abutment surface 22a facing towards the upstream side of the air flow around the entire periphery, and an elastic body mounting portion 22b on the front end side which is the inner side seen from the left maintenance port 27. In the elastic body mounting portion 22b, is provided an elastic body 34 formed of a plate spring.

Figure 4:
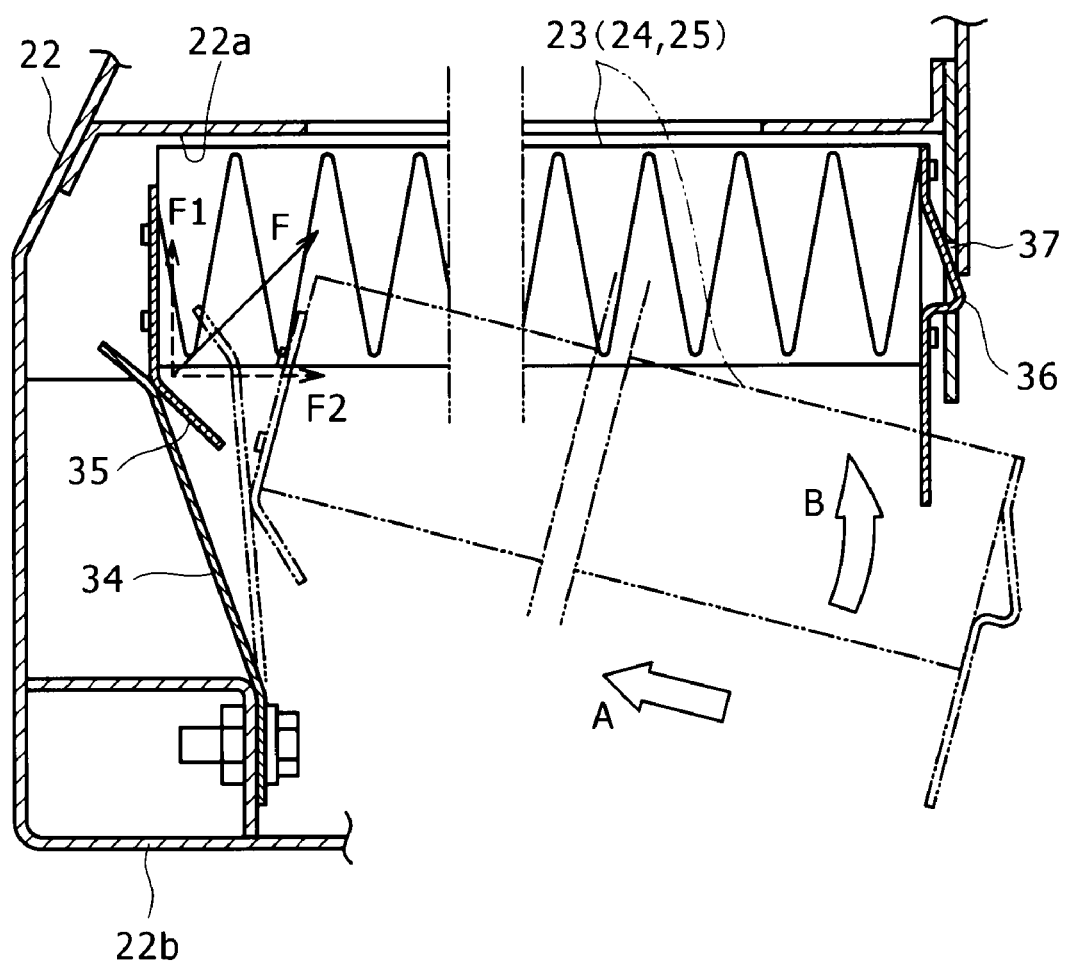
FIG. 4 is a further enlarged view showing a part in the state of mounting the filter.

In the elastic body 34, as shown in FIG. 4 in detail, for each of both the filters 24 and 25, a base end part thereof is mounted to the elastic body mounting portion 22b in a state that a tip thereof opposes to the filter abutment surface 22a. At the time of inserting the filter, the elastic body 34 is pushed in to the front side by an elastic body protector (elastic body protecting member) 35 provided in a front end part thereof.

By the above pushing-in effect, the elastic body 34 is inclined so as to generate a restoring force (elastic force) F. As a component force thereof, a force (pressing force) F1 for pressing the filters 24 and 25 onto the filter abutment surface 22a and a force (position fixing force) F2 for pushing the filters 24 and 25 rearwards work on the front end side of the filter.

Meanwhile, on the rear end side of the filters 24 and 25, an engaging claw 36 protruding in a downwardly-turned shape is provided in the filters 24 and 25, and an engaging hole 37 is provided in the filter mounting portion 22. As shown in the figure, when the filters 24 and 25 are inserted in the arrow A direction and then the rear end side thereof is pushed in the arrow B direction, the engaging claw 36 is automatically and elastically engaged with the engaging hole 37.

It should be noted that although both the filters 24 and 25 can be mounted by the above procedure and operation at the same time, the filters 24 and 25 are normally mounted in tandem.

The elastic body 34 and the engaging claw 36 and the engaging hole 37 may be provided at an intermediate position in the up and down direction of the filters 24 and 25, or may be provided on the upper end side or the lower end side.

By the above effect, both the filters 24 and 25 are mounted to the filter mounting portion 22 in a state of closely adhering to the filter abutment surface 22a.

As mentioned above, according to the present structure, it is possible to press the filters 24 and 25 onto the filter abutment surface 22a and fix the positions thereof by the elastic body 34. Therefore, in comparison to a conventional mounting structure of using a fastening tool such as a butterfly bolt, there is no need for a troublesome fastening operation and position fixing, and the fastening tool is not lost.

Since the restoring force of the elastic body 34 works as the pressing force F1 and the position fixing force F2 to the filters 24 and 25, and there is no part which is directly fastened by hand unlike a conventional fastening tool method. Therefore, there is no need for accessing to the inner side which is not easily touched.

That is, by a one-touch operation of pushing the rear end side in the arrow B direction after inserting the filters 24 and 25 in the arrow A direction, it is possible to extremely easily and rapidly mount the filter. Removal of the filters 24 and 25 is, conversely to the mounting, performed by only drawing the entire body after releasing the engagement on the rear end side and returning to the opposite side to the arrow B.

Therefore, an attachment and detachment work of the filters 24 and 25 is easily performed, and it is possible to greatly improve maintenance property.

Further, (i) since the filters 24 and 25 are forcedly and elastically pressed onto the filter abutment surface 22a by the pressing force F1 from the elastic body 34, it is possible to ensure an airtightness (sealing property) between both the filters; and (ii) since the position fixing force F2 by the elastic body 34 works as a force in the direction of engaging the engaging claw 36 with the engaging hole 37, an engagement state of both the engaging claw 36 and the engaging hole 37 is reinforced. Therefore, it is possible to obtain a strong and stable filter mounting state, and there is no fear that the filters 24 and 25 are vibrated, displaced or removed by vibration of the machine or the like.

Meanwhile, the cutouts 32 and 33 for accepting the passage of the filters 24 and 25 are provided in the opening edge parts on both the upper and lower sides of the left maintenance port 27 in the counterweight 26. Therefore, it is possible to insert and take out the filters 24 and 25 with maintaining a vertical posture thereof, and it is also possible to suppress a weight loss of the counterweight 26 to a minimum which is only weight of the cutouts 32 and 33.

That is, it is possible to satisfy a requirement of minimizing the maintenance port 27 in order to ensure an original counterweight function of counter balance, and a requirement of ensuring space for inserting or taking out the filters 24 and 25 at the same time.

Since the cutouts 32 and 33 serve as the guides for inserting and taking out the filter as above described, the filter attachment and detachment work is more easily performed.

Further, in the case where the engaging claw 36 and the engaging hole 37 are provided on the upper end side of the upper filter 24 and the lower end side of the lower filter 25, it is possible to easily perform a removing operation of the engaging claw 36 from the engaging hole 37 by the upper and lower cutouts 32 and 33.

Figure 5:
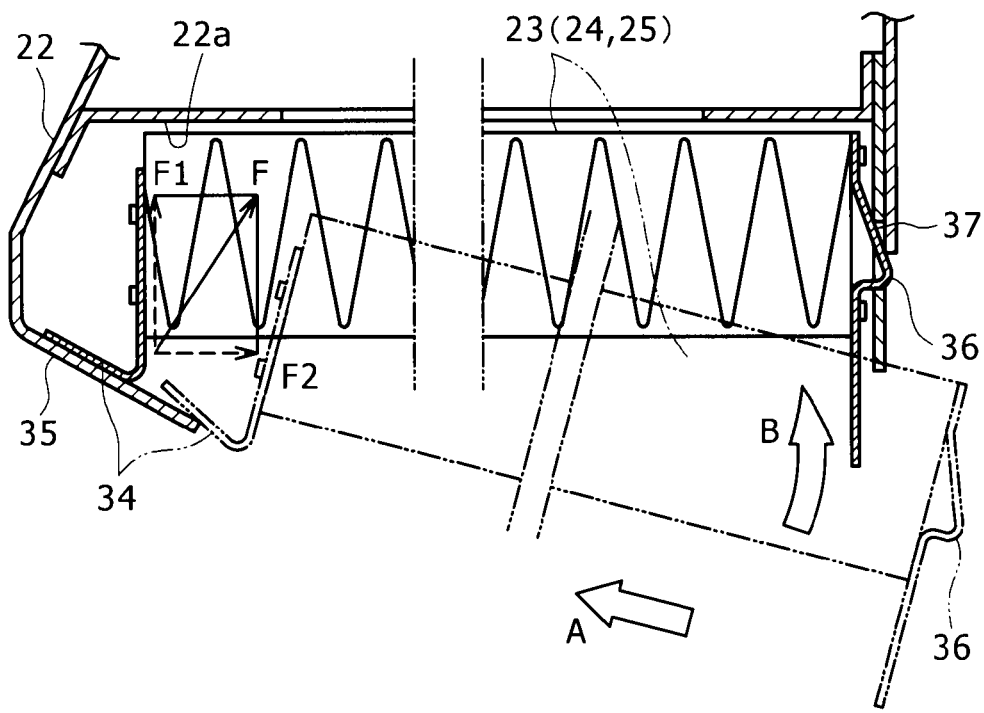
FIG. 5 is a view corresponding to FIG. 4 showing a second embodiment of the present invention.
Figure 6:
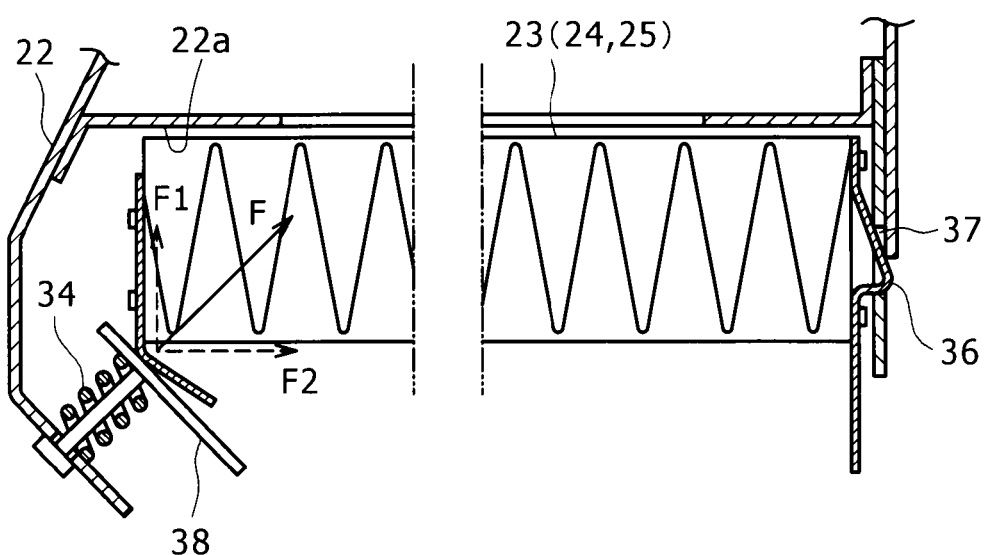
FIG. 6 is a view corresponding to FIG. 4 showing a third embodiment of the present invention.
Figure 7:
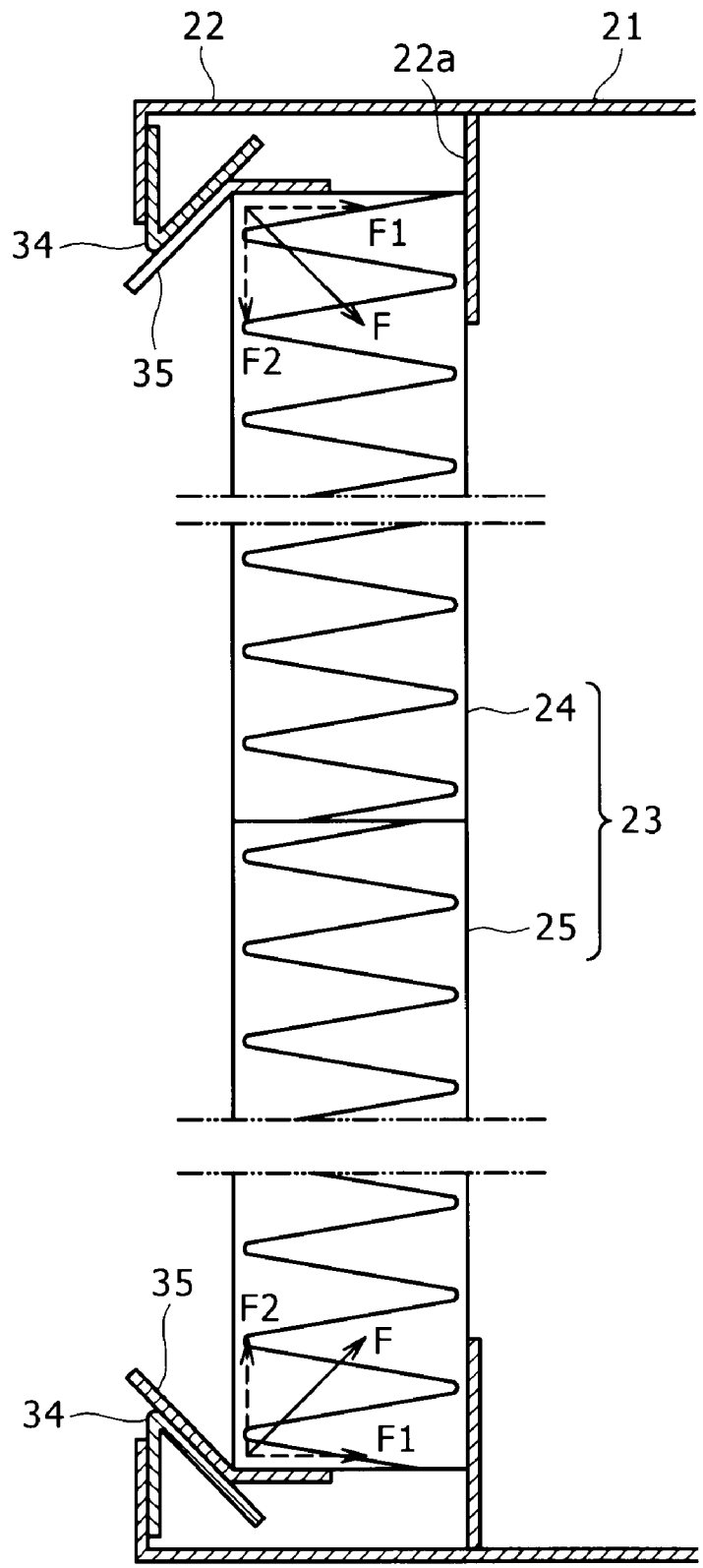
FIG. 7 is an enlarged vertically sectional view of a filter mounting portion showing a fourth embodiment of the present invention.
Figure 8:
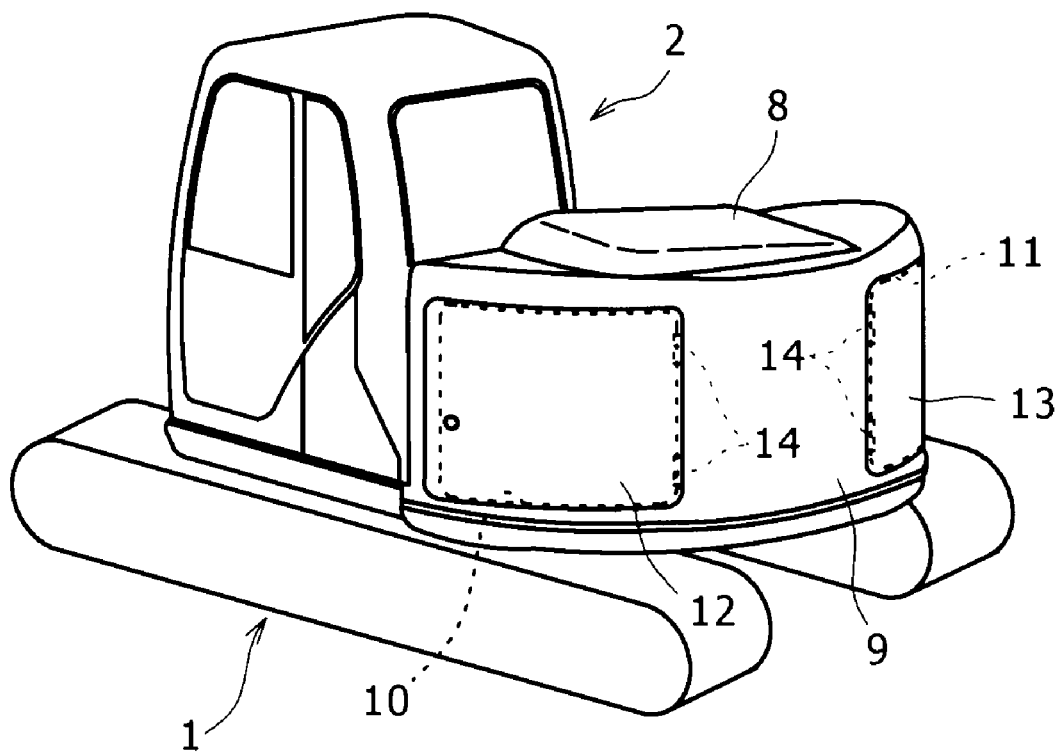
FIG. 8 is a perspective view of a hydraulic excavator to which the present invention is applied seen from the rear side.
Figure 9:
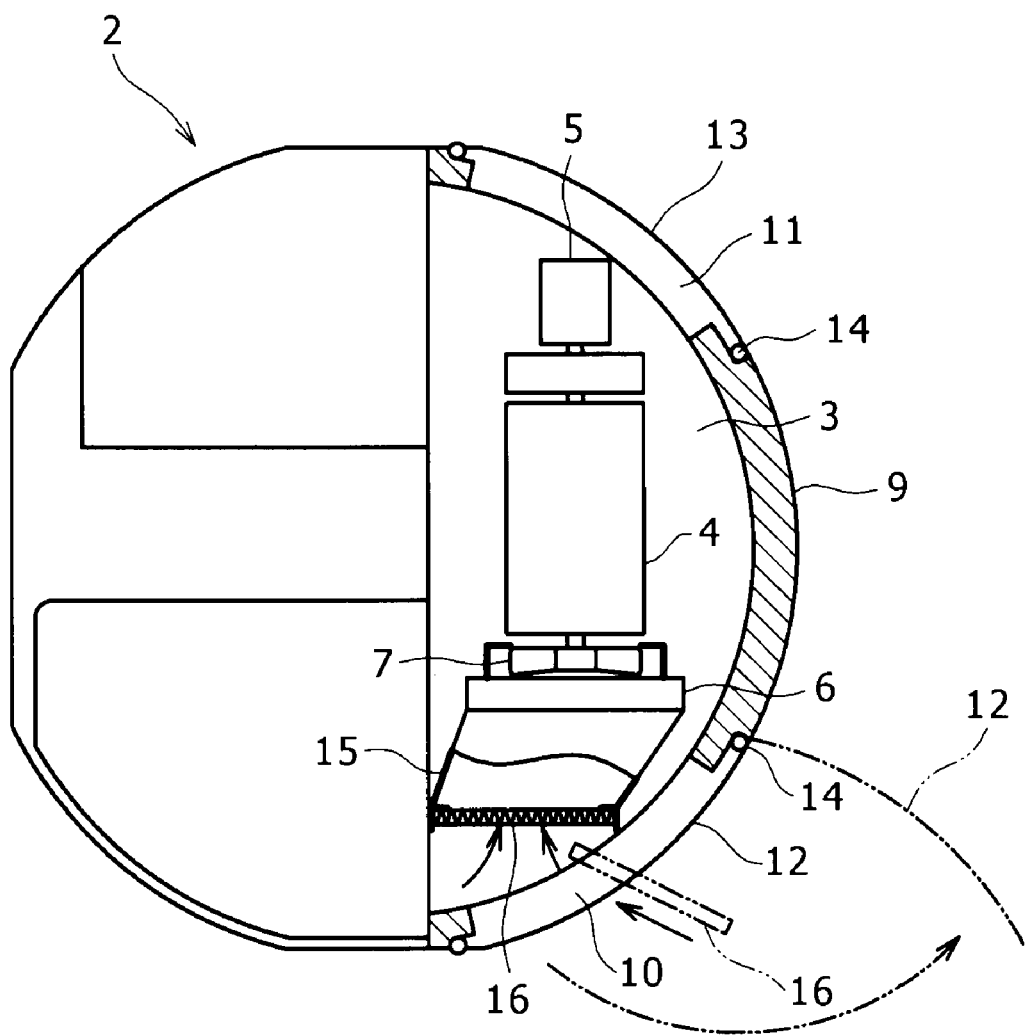
FIG. 9 is a schematic plan view of the hydraulic excavator to which the present invention is applied.
Figure 10:
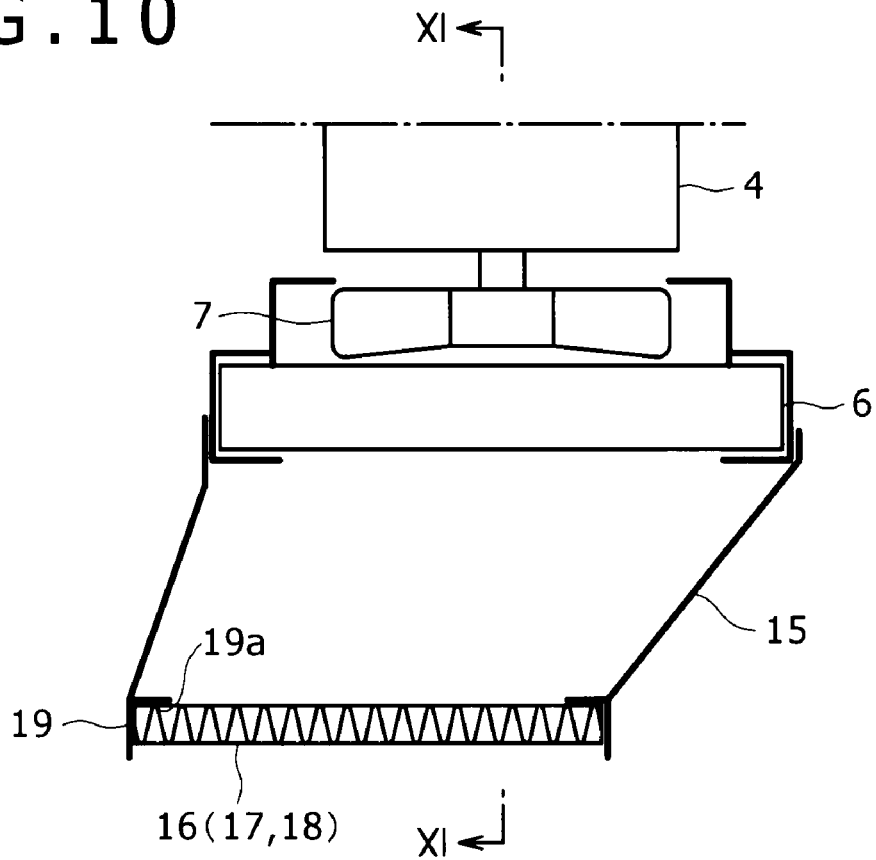
FIG. 10 is a partially enlarged view of FIG. 9.
Figure 11:
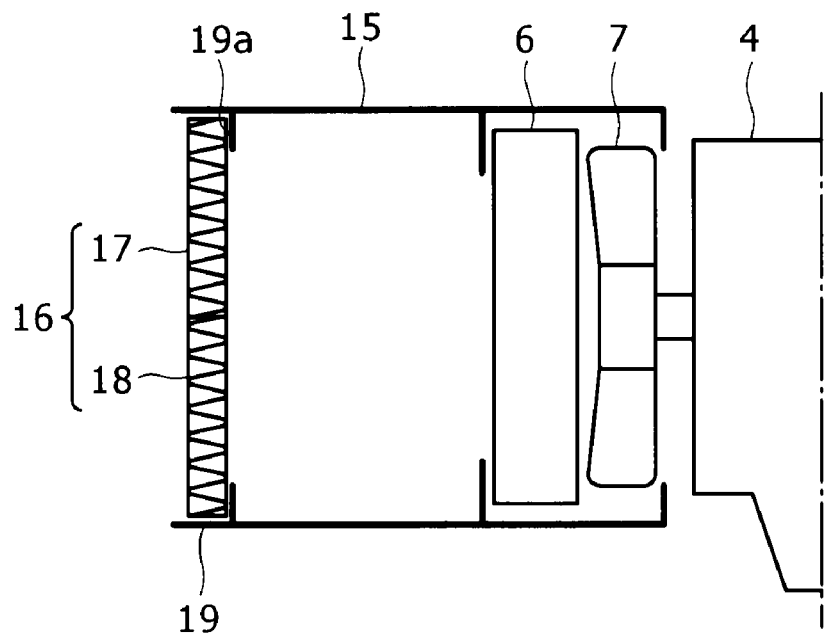
FIG. 11 is a sectional view by line XI-XI in FIG. 10.

Second to Fourth Embodiments (Refer to FIGS. 5 to 7)

A description will be only given to a different point from the first embodiment.

In the first embodiment, the elastic body 34 is provided on the filter mounting portion 22 side, and the elastic body protector 35 is provided on the filters 24 and 25 side. While, in a second embodiment shown in FIG. 5, the elastic body protector 35 is conversely provided on the filter mounting portion 22 side, and the elastic body (plate spring in a substantially V shape seen from the top) 34 is provided on the filters 24 and 25 side.

In such a case, a point that the restoring force (elastic force) F works due to contact between the elastic body 34 and the elastic body protector 35, and as the component force thereof, the pressing force F1 and the position fixing force F2 work is the same as the first embodiment.

In a third embodiment shown in FIG. 6, as the elastic body 34, a coil spring is used instead of the plate spring. The above elastic body 34 is mounted to the filter mounting portion 22 through an elastic body receiver 38, and the restoring force F of the elastic body 34 and the component force thereof (pressing force F1 and the position fixing force F2) are generated by bringing the elastic body protector 35 into contact with the elastic body receiver 38.

It should be noted that the above configuration can be applied to a case where the elastic body 34 is provided on the filters 24 and 25 side, and the elastic body protector 35 is provided on the filter mounting portion 22 side as in the second embodiment.

In the above first to third embodiments, the restoring force F of the elastic body 34 works on the front end side of the filters 24 and 25. While, in a fourth embodiment shown in FIG. 7, the elastic bodies 34 are provided in an upper edge part and a lower edge part of the filter mounting portion 22, and the restoring forces F thereof work in the up and down direction on the upper end side of the upper filter 24 and the lower end side of the lower filter 25.

In such a case, the working direction of the pressing force F1 serving as the component force is the same as the first to third embodiments.

Meanwhile, the position fixing force F2 works downwards on the upper filter 24 and upwards on the lower filter 25. By the force F2, both the filters 24 and 25 are closely adhered to each other on end surfaces which are in contact with each other in the up and down direction so that positions thereof are mutually fixed.

It should be noted that in the case of the above configuration, a horizontal dividing member may be provided in a central part in the up and down direction of the filter mounting portion 22, and both the filters 24 and 25 may be closely adhered to the dividing member by the position fixing force F2. Alternatively, in the above adhered part, the engaging claw 36 and the engaging hole 37 used in the first to third embodiments may be provided.

The configuration of the fourth embodiment is particularly effective under a situation that the filters 24 and 25 are inserted and taken out from the front surface side of the cooler, and further size of the maintenance port in the up and down direction is small for the filters 24 and 25.

Other Embodiments (1) The above embodiments exemplify a type in which the filter 23 is divided into two on the upper and lower sides. However, the present invention can also be applied to a case where the filter 23 is formed as a single filter.

Here, in the case where the restoring force F of the elastic body 34 works on the front end side of the filter 23 as in the first to third embodiments shown in FIGS. 1 to 6, the elastic body 34 may be provided only in an intermediate part in the up and down direction of the filter, or may be provided on both the upper and lower sides. Alternatively, the elastic body 34 may be provided on both the upper and lower sides and the intermediate part.

Meanwhile, in the case where the restoring force F of the elastic body 34 works in the up and down direction as in the fourth embodiment shown in FIG. 7, the configuration of the above embodiment in which the elastic bodies 34 are provided on both the upper and lower sides may be directly applied to the single filter. In such a case, the position fixing forces F2 in the up and down direction serving as the component forces of the restoring forces F of the elastic bodies 34 on both the upper and lower sides work on the single filter 23 as a compression force in the up and down direction, and by the compression force, the position of the filter 23 is fixed.

Alternatively, the configuration of the first to third embodiments is adopted, and for example, the elastic body 34 may be provided on the upper end side of the single filter 23 and the engaging claw 36 and the engaging hole 37 may be provided on the lower end side.

(2) The filter 23 is formed by mounting a filter frame on a circumference of a filter main body as mentioned above including a type of dividing into two on the upper and lower sides. In the above configuration, as means for smoothly performing an operation of inserting and taking out the filter 23, a smooth material with low coefficient of friction such as nylon resin may be used as the filter frame, or the above material may be adhered to the entire surface or an important point of the filter frame.

(3) As the elastic body 34, instead of a spring body such as the plate spring and the coil spring in the above embodiment, a rubber in a thick plate shape or a block shape with high elasticity may be used. In such a case, a metal plate for preventing abrasion is desirably provided on a surface of the rubber.

Although the invention has been described with reference to the preferred embodiments in the attached figures, it is noted that equivalents may be employed and substitutions made herein without departing from the scope of the invention as recited in the claims.

We claim:

1. A mounting structure of filter for a cooler of a construction machine having an upper rotating body disposed on a lower traveling body, the mounting structure being detachably mounted on a front surface side of the cooler installed in an engine room of the upper rotating body, the mounting structure comprising:

a filter mounting portion provided on the front surface side of the cooler, the filter mounting portion being provided with a filter abutment surface with which the filter may be brought into abutment from the front side of the filter mounting portion;

an external body forming the engine room, the external body being provided with a maintenance port into or from which the filter is inserted or taken out; and an elastic body for exerting an elastic force in the direction of fixing a position of the filter inserted from the maintenance port to said filter mounting portion in a state that the filter is pressed onto the filter abutment surface, wherein said elastic body is provided on one of the filter and the filter mounting portion, and wherein an elastic body protecting member is provided on the other of the filter and the filter mounting portion, wherein the elastic body presses against the elastic body protecting member at a time when the filter is being inserted, whereby the elastic body is deformed to generate a restoring force, the restoring force having a component comprising a pressing force acting in a direction of pressing the filter onto the filter abutment surface, and further having a component comprising a position fixing force acting in a direction perpendicular to the pressing force for fixing the position of the filter on the filter mounting portion.

2. The mounting structure of filter for cooler of construction machine according to claim 1, wherein the filter extends in the front and rear direction of the upper rotating body, and wherein said elastic body is provided in a state of exerting a pressing force of pressing the filter onto the filter abutment surface at a side of the filter which is closer to the front end of the upper rotating body, and a position fixing force of pushing the filter rearwards of the upper rotating body.

3. The mounting structure of filter for cooler of construction machine according to claim 2, wherein an engaging claw is provided in one of a rear end part of the filter and said filter mounting portion, an engaging hole is provided in the other of the rear end part of the filter and said filter mounting portion, and the position fixing force of said elastic body acts in the direction of engaging the engaging claw with the engaging hole.

4. The mounting structure of filter for cooler of construction machine according to claim 2, further comprising:

a counterweight also serving as a part of said external body and provided in a rear end part of the upper rotating body, a maintenance port provided in the counterweight, and cutouts for accepting passage of the filter at the time of inserting or taking out the filter provided in opening edge parts on both the upper and lower sides of the maintenance port.

5. The mounting structure of filter for cooler of construction machine according to claim 1, wherein the filter extends in the front and rear direction of the upper rotating body, and said elastic body is provided in a state of exerting, at one vertical end of the filter, a pressing force for pressing the filter onto the filter abutment surface, and a position fixing force acting in the up and down direction.

6. The mounting structure of filter for cooler of construction machine according to claim 1, wherein a duct for bringing the air taken from the exterior to the cooler is provided on the front surface side of the cooler, and said filter mounting portion is provided in a tip of the duct.

7. The mounting structure of filter for cooler of construction machine according to claim 1, wherein the filter is divided into an upper filter and a lower filter on the upper and lower sides respectively, and elastic bodies are provided in both the filters respectively.

8. The mounting structure of filter for cooler of construction machine according to claim 1, wherein a plate spring serving as said elastic body is provided in one of the filter and said filter mounting portion, and an elastic body protector brought in contact with the plate spring for transmitting a pressing force and a position fixing force to the filter is provided in the other.

* * * * *